US005515675A

United States Patent [19]

Bindschatel

[11] Patent Number: 5,515,675

[45] Date of Patent: May 14, 1996

[54] APPARATUS TO CONVERT A FOUR-STROKE INTERNAL COMBUSTION ENGINE TO A TWO-STROKE PNEUMATICALLY POWERED ENGINE

[76] Inventor: Lyle D. Bindschatel, 7617 Wood Rd., Corryton, Tenn. 37721

[21] Appl. No.: 425,790

[22] Filed: Apr. 20, 1995

Related U.S. Application Data

[63] Continuation-in-part of Ser. No. 344,162, Nov. 23, 1994, abandoned.

[51] Int. Cl.[6] .......... F16D 31/02

[52] U.S. Cl. .......... 60/370; 60/407

[58] Field of Search .......... 60/370, 371, 325, 60/407, 408, 415, 416; 180/68.3, 271, 287

[56] References Cited

U.S. PATENT DOCUMENTS

| | | | |
|---|---|---|---|
| 3,547,042 | 12/1970 | O'Connor | 104/155 |
| 3,704,760 | 12/1972 | Maruyama | 180/66 B |
| 3,765,180 | 10/1973 | Brown | 60/370 |
| 3,885,387 | 5/1975 | Simington | 60/370 |
| 3,925,984 | 12/1975 | Holleyman | 60/370 |
| 3,980,152 | 9/1976 | Manor | 180/66 B |
| 4,018,050 | 4/1977 | Murphy | 60/370 |
| 4,102,130 | 7/1978 | Stickiin | 60/407 |
| 4,162,614 | 7/1979 | Holleyman | 60/370 |
| 4,292,804 | 10/1981 | Rogers, Sr. | 60/407 |
| 4,311,917 | 1/1982 | Hencey, Jr. et al. | 290/1 A |
| 4,337,842 | 7/1982 | Spangler et al. | 180/302 |
| 4,355,508 | 10/1982 | Blenke et al. | 60/416 |
| 4,370,857 | 2/1983 | Miller | 60/413 |
| 4,383,589 | 5/1983 | Fox | 180/165 |
| 4,478,304 | 10/1984 | Delano | 180/165 |
| 4,507,918 | 4/1985 | Holleyman | 60/370 |
| 4,596,119 | 6/1986 | Johnson | 60/407 |
| 4,616,476 | 10/1986 | Oneyama et al. | 60/414 |
| 4,651,525 | 3/1987 | Cestero | 60/416 |
| 4,769,988 | 9/1988 | Clark | 60/371 X |
| 4,774,891 | 10/1988 | Coester | 104/130 |
| 4,896,505 | 10/1990 | Holleyman | 60/370 |
| 5,115,145 | 5/1992 | Westberg | 307/10.3 |
| 5,163,292 | 11/1992 | Holleyman | 60/370 |
| 5,326,229 | 7/1994 | Collins | 417/201 |
| 5,375,417 | 12/1994 | Barth | 60/370 |

*Primary Examiner*—Hoang Nguyen

[57] ABSTRACT

An apparatus (10) to convert a four-stroke internal combustion engine to a two-stroke pneumatically powered engine. An air compressor (60) is driven using the rotation of the crankshaft (22) and compressed air is delivered through a supply line (74) to at least one holding tank (68). A supply line (76) delivers compressed air from the tank (68) through a regulator (20), which controls the pressure and volume, to the pneumatic distributor (24). A plurality of high pressure hoses (50) finally communicates the compressed air to the cylinders (86) of the engine (12) via the spark plug orifices (18). The pneumatic distributor (24) has a rotor (42) which opens gate valves (44) to supply compressed air to the cylinders (86) wherein the pistons (88) are at top dead center, making every downstroke a power stroke. The modified dual-lobed camshaft (80) operates the exhaust valves (84) so that every upstroke of a piston (88) is an exhaust stroke and exhaust freely escapes through the exhaust manifold (90).

2 Claims, 3 Drawing Sheets

APPARATUS TO CONVERT A FOUR-STROKE INTERNAL COMBUSTION ENGINE TO A TWO-STROKE PNEUMATICALLY POWERED ENGINE

RELATED U.S. APPLICATION DATA

This application is a continuation-in-part of my application Ser. No. 344,162 filed Nov. 23, 1994, now abandoned.

TECHNICAL FIELD

This invention relates to the field of combustion engines. More specifically, this invention relates to an apparatus to convert a four-stroke internal combustion engine to a two-stroke pneumatically powered engine.

BACKGROUND ART

In the field of combustion engines, it is well known that fuels such as gasoline, diesel, and ethanol are used in a combustion process to power engines. However, it is also well known that the use of such fuels generates byproducts which are harmful to the environment. Further, aside from environmental concerns, the use of such fuels is costly to the consumer.

In view of these concerns, it is desirable to at least substantially reduce, if not eliminate, the use of combustible fuels. One source of power is compressed air, or pneumatics. Several devices have been developed for using pneumatic power to operate engines. Pneumatically powered engines and devices to convert engines to pneumatic or other pressurized fluid power are known in the art, but they have not been well received by industry for several reasons.

One reason is that some of these inventions depend upon a new engine block, a very expensive and impractical idea.

Another reason is that many of these devices do not adequately address leakage problems, and engine efficiency is compromised.

Yet another reason is that several of these inventions do not eliminate the compression stroke, a severe restriction to engine operation which could only be overcome by providing extremely high pressures. But this is impractical since most compressors are designed to produce less than 200 p.s.i., 125 p.s.i. is most common.

Another reason is that several of these inventions include recirculating or recycling devices, again a significant resistant force against efficient engine operation and unnecessary in the case of compressed air since it is non-polluting.

Still another reason is that some of these inventions include somewhat complicated devices or even numerous devices for distributing and/or delivering compressed air or pressurized fluid to the cylinders.

Typical of the art are those devices disclosed in the following United States Letters Patents:

| U.S. Pat. No. | Patentee | Issue Date |
|---|---|---|
| 3,885,387 | Simington | May 27, 1975 |
| 3,925,984 | Holleyman | Dec 16, 1975 |
| 4,018,050 | Murphy | Apr 19, 1977 |
| 4,102,130 | Stricklin | Jul 25, 1978 |
| 4,162,614 | Holleyman | Jul 31, 1979 |
| 4,292,804 | Rogers, Sr. | Oct 6, 1981 |
| 4,596,119 | Johnson | Jun 24, 1986 |
| 4,896,505 | Holleyman | Jan 30, 1990 |

-continued

| U.S. Pat. No. | Patentee | Issue Date |
|---|---|---|
| 5,163,292 | Holleyman | Nov 17, 1992 |

Simington ('387) shows an air drive adaptor consisting of a valving means for introducing compressed air to engine cylinders, however no means of eliminating the compression stroke is shown. Atmospheric air is admitted via intake valve on intake stroke, compressed during compression stroke, supplemented by compressed air via valving means for power stroke, then exhausted to atmosphere on exhaust stroke.

U.S. Pat. No. 3925984 is a compressed air power plant which uses manifold means and solenoid operated valves to deliver compressed air to cylinders. Discharged air is received in an exhaust tank and is then pumped into a high-pressure tank. This invention does not claim a means of converting a four-stroke internal combustion engine to a two-stroke engine operated by compressed air.

Murphy ('050) teaches a compressed air operated motor employing dual lobe cams using a modified camshaft to operate both intake and exhaust valves of the motor. Compressed air must be continuously supplied to the intake manifold. The large perimeter of the intake manifold must be adequately sealed to contain the compressed air. Exhausted air is recompressed. Murphy does not use a distributor. As described, this invention may require a new intake manifold, an economical disadvantage.

The invention by Stricklin ('130) converts a four-stroke internal combustion engine into a two-stroke engine powered by steam or compressed air by changing the relation of the camming action either by replacing the camshaft gear to one the same size as the crankshaft gear or by modifying the camshaft lobes to being dual-lobed. He does not use a distributor but uses the intake valves and intake ports to introduce steam or compressed air from the manifold to the cylinders. Sealing the large perimeter of the intake manifold to contain the pressure may be a significant problem. This invention includes a means of reversing the direction of the engine operation so that the transmission and/or clutch can be removed.

U.S. Pat. No. 4162614 is a pressure fluid operated power plant that includes a distributor which simply splits the main supply line into a plurality of supply lines, one for each cylinder of the engine, an actuating valve for each individual supply line, and a unitary inlet and exhaust valve, or spool valve, for each cylinder to control the intake and exhaust of pressure fluid. As shown, the engine is not a converted four-stroke internal combustion engine, but a different engine with the crankshaft configured so that the pistons do not operate in pairs and without the standard engine valves. Also, fluid exhaust goes into a tank to be recycled for re-use or for use elsewhere.

Rogers, Sr. ('804) shows electrically operated valve actuating means to control the intake of compressed gas to the cylinders. He also provides for recycling at least a portion of the gas exhausted to be recompressed or to cool transmission fluid or to be used as a working fluid in an air conditioning system. The valve actuator operates only one valve at a time and therefore only one cylinder receives compressed gas. Applied to a typical engine, the compression stroke is not eliminated. No provision is made to convert the engine to a two-stroke operation. This invention also uses altering means for increasing the duration of each engine cycle over which the valve means admits compressed gas to the at least one cylinder as the speed of the engine increases. However, compressed gas must be supplied during the entire power stroke, regardless of the speed of the engine.

Johnson ('119) teaches a compressed air propulsion system for a vehicle which includes an air distributor system comprising a plurality of solenoids and electrically operated microswitches to operate air supply intake valves. Johnson does not show a means of eliminating the compression stroke, that is, he is not converting a four-stroke engine to two-stroke operation.

U.S. Pat. No. 4896505 is a pressurized fluid operated engine that includes a rotary type distributor which supplies pressurized fluid to the engine cylinders via spool valves which control both intake and exhaust. This invention includes a recirculation means for recycling at least a portion of exhaust gas. Holleyman attempts to address the resulting resistance to engine operation by describing ejector means. The rotary distributor means as described and shown would present problems relating to leakage to other than the desired supply line and if tightly assembled to reduce leakage, friction would be created, and therefore heat and resistance. As with his earlier patents, Holleyman is not converting a typical four-stroke engine to a two-stroke operation for pressurized fluid. He does not show the standard configuration of the crankshaft whereby pistons move in pairs and does not show the engine's intake and exhaust valves.

U.S. Pat. No. 5163292 shows the rotary distributor of Holleyman's previous patent has been modified to lengthen the amount of time that pressurized fluid is permitted through each supply line to a cylinder via a pressure sensitive snap action diaphragm valve. However there has been no modification made to the rotary distributor to address the problem of pressurized fluid leakage to undesired supply lines. The diaphragm valves replace the former spool valves for controlling intake and exhaust of pressurized fluid. Exhaust pressure must exceed inlet pressure for valves to operate on the exhaust stroke and this could cause some resistance. Holleyman also includes a fluid mixing means used to recycle spent fuel. Like his previous patents, Holleyman does not claim to be converting a combustion engine to a two-stroke operation to use pressurized fluid.

In view of the prior art, it is the main object of this invention to provide an improved apparatus to convert a four-stroke internal combustion engine to a two-stroke pneumatically powered engine which minimizes the aforementioned problems, that is, leakage and resistant forces are eliminated thereby achieving the maximum efficiency and performance of the engine.

It is another object of this invention to provide an apparatus to convert a four-stroke internal combustion engine to a two-stroke pneumatically powered engine in order to preserve natural resources.

It is a further object of the present invention to provide an improved pneumatic distributor for mounting on an existing timing mechanism of an engine, the pneumatic distributor operating in similar fashion to conventional electrical distributors while eliminating the need for electrical current thereto.

Another object of the present invention is to provide an apparatus to convert a four-stroke internal combustion engine to a two-stroke pneumatically powered engine while retaining a substantial portion of the existing parts of the engine, thereby minimizing the costs involved in such conversion.

Still another object of this invention is to provide an apparatus to convert a four-stroke internal combustion engine to a two-stroke pneumatically powered engine such that air and noise pollution created by the operation of the engine is substantially reduced.

Yet another object of the present invention is to provide such an apparatus to convert a four-stroke internal combustion engine to a two-stroke pneumatically powered engine whereby the cost of operation of the engine is substantially reduced.

Other objects and advantages will be accomplished by the present invention which serves to replace combustible fuel systems associated with the operation of an engine. Thus, the present invention is designed to preserve natural resources which are rapidly being depleted.

BRIEF SUMMARY OF THE INVENTION

The apparatus to convert a four-stroke internal combustion engine to a two-stroke pneumatically powered engine is comprised generally of a pneumatic distributor, a modified dual-lobed camshaft for operation of the exhaust valves, at least one air compressor, at least one compressed air holding tank, and a regulator to control the pressure and volume of compressed air being delivered to the engine. An air compressor is driven using the rotation of the crankshaft. Compressed air is delivered from the compressor through a supply line to at least one holding tank. A supply line is provided for delivering compressed air from the tank to the engine. After passing through the regulator, the compressed air enters the pneumatic distributor. A plurality of high pressure hoses is provided for finally communicating the compressed air to the cylinders of the engine via the spark plug orifices. The pneumatic distributor has a rotor mountable to the existing timing mechanism, and the rotor opens the gate valves to supply compressed air to the cylinders wherein the pistons are at top dead center, making every downstroke a power stroke. The modified dual-lobed camshaft operates the exhaust valves so that every upstroke of a piston is an exhaust stroke, and exhausted air freely escapes through the exhaust manifold.

BRIEF DESCRIPTION OF THE DRAWINGS

The above mentioned features of the invention will become more clearly understood from the following detailed description of the invention read together with the drawings in which.

DESCRIPTION OF THE PREFERRED EMBODIMENT

An apparatus to convert a four-stroke internal combustion engine to a two-stroke pneumatically powered engine incorporating various features of the present invention is illustrated generally at 10 in the figures. The apparatus to convert a four-stroke internal combustion engine to a two-stroke pneumatically powered engine, or apparatus 10, is designed for replacing combustible fuel systems associated with the operation of an engine 12. In so doing, in the preferred embodiment the apparatus 10 is designed to preserve natural resources which are rapidly being depleted.

Figure 1:
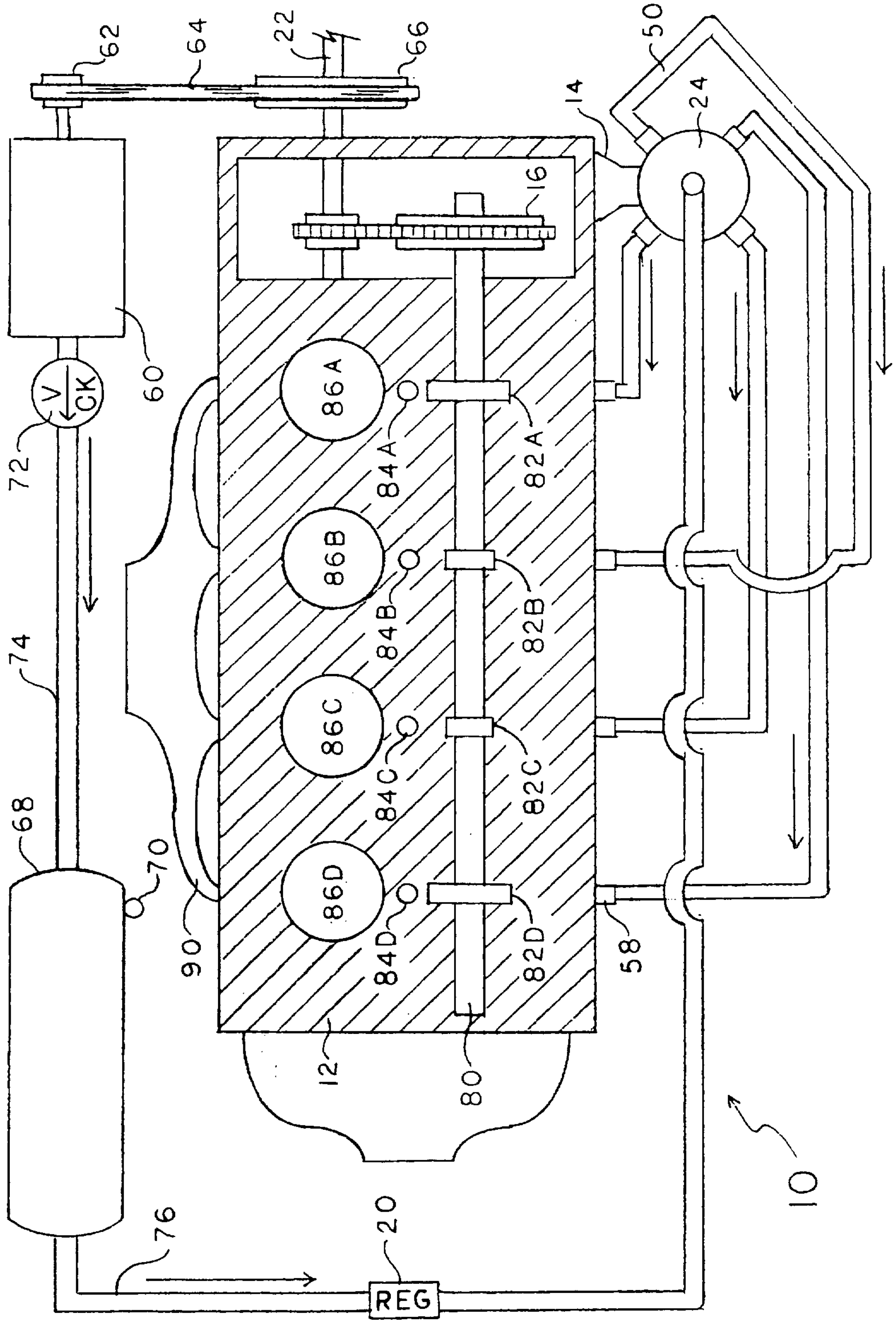
FIG. 1 is a diagrammatic top plan view of a typical four-stroke internal combustion engine converted to a two-stroke pneumatically powered engine using the apparatus of this invention.

As illustrated in FIG. 1, the apparatus 10 of the present invention is comprised generally of a pneumatic distributor 24, a modified dual-lobed camshaft 80, at least one air compressor 60, at least one compressed air holding tank 68, and a regulator 20. The apparatus 10 is used in conjunction with a conventional four-stroke internal combustion engine 12 in lieu of several conventional components. Namely, the carburetor, the original camshaft, the electric distributor, the spark plugs, spark plug wires, fuel pump, fuel lines, fuel tank, and the emissions control system are several of those removed components.

An air compressor 60 is operated using the rotation of the crankshaft 22. A crankshaft pulley 66 is provided for engaging a belt 64, the belt 64 being provided for driving the pressure sensor clutch 62 provided by the air compressor 60. When the engine 12 is running, the air compressor 60 is continually compressing air into at least one compressed air holding tank 68 through a check valve 72 and supply line 74. Air is being compressed by the air compressor 60 even while the engine 12 is idling such that the compressed air supply is continuously being replenished. The tank 68 is provided with a bleeder valve 70 to evacuate any condensation collected therein.

A supply line 76 is provided to deliver compressed air from the tank 68 to the engine 12. Upon exiting the tank 68, the compressed air is delivered through a regulator 20, which controls the pressure and volume of the compressed air, and passes through the supply line 76 to a pneumatic distributor 24.

Figure 2:
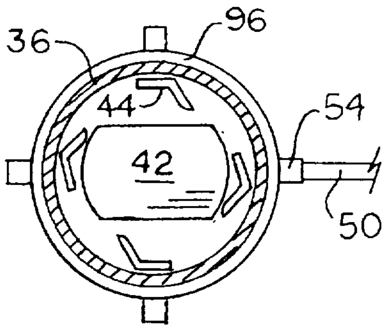
FIG. 2 is an enlarged top plan view of the pneumatic distributor of the apparatus of this invention with its upper housing member removed.
Figure 5:
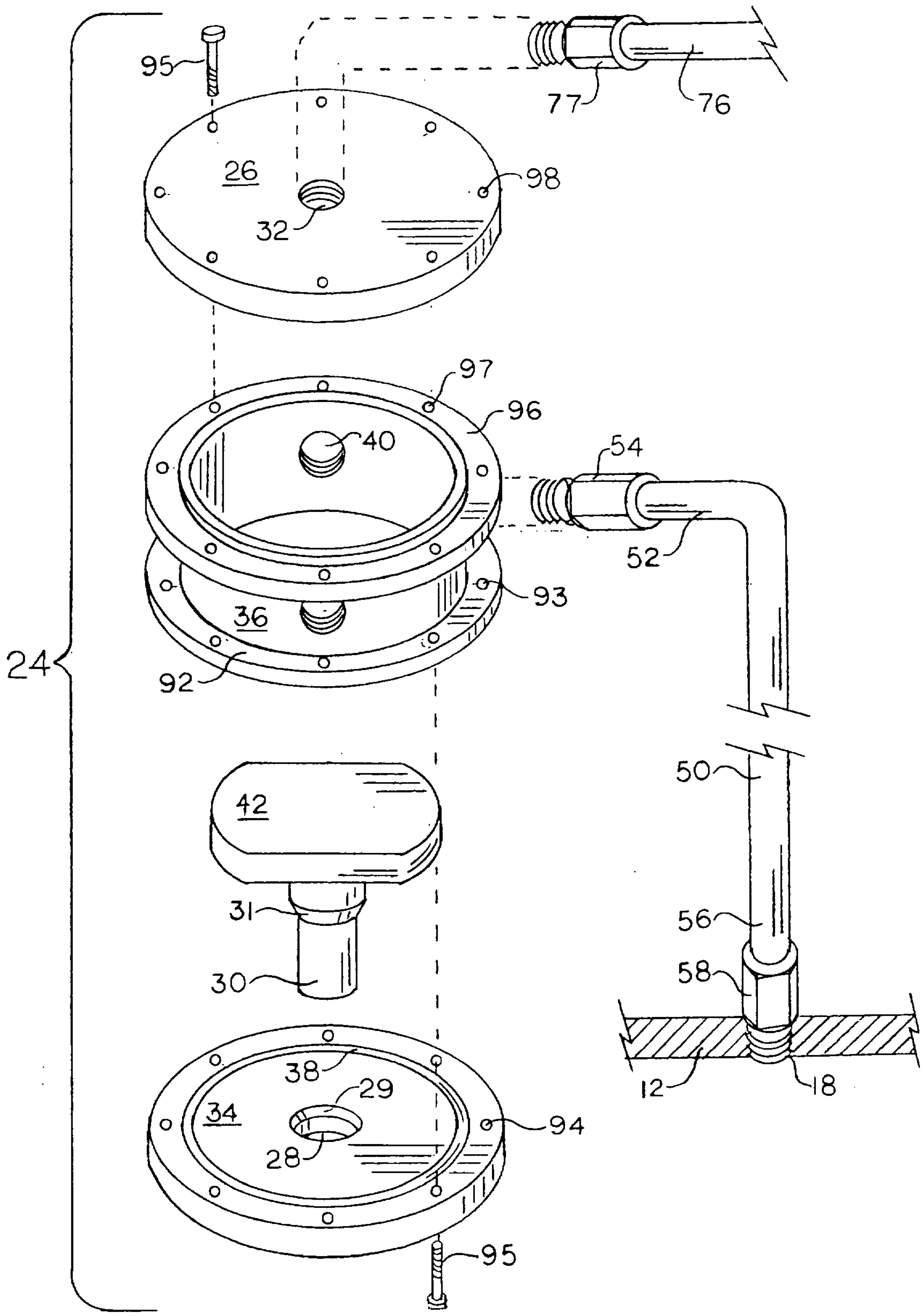
FIG. 5 is an exploded view of the pneumatic distributor constructed in accordance with this invention.

The pneumatic distributor 24 is shown in FIGS. 2 and 5. The pneumatic distributor 24 is comprised of a lower housing member 34, a center housing member 36, a plurality of gate valves 44, a rotor 42, and an upper housing member 26.

The lower housing member 34 has a through opening 28 with a beveled top edge 29 for receipt of the rotor mount 30 of the rotor 42, a plurality of bolt holes 94 radially spaced near the outer perimeter, and a groove 38 for receipt of a seal (not shown) and the bottom edge of the center housing member 36.

The rotor 42 has a rotor mount 30 with a beveled portion 31 to be closely received by the through opening 28 and its beveled top edge 29 of the lower housing member 34.

The upper housing member 26 defines a threaded inlet portal 32 for receipt of fitting 77 on compressed air supply line 76, a plurality of radially spaced bolt holes 98, and a groove on its underside, not visible but essentially the same as groove 38 in the lower housing member 34, for receipt of a seal (not shown) and the top edge of the center housing member 36.

Figure 6:
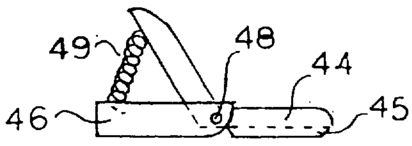
FIG. 6 is an enlarged top edge view of the gate valve assembly of the pneumatic distributor.

The center housing member 36 is cylindrically shaped with a lower protruding portion 92 having radially spaced threaded bolt holes 93 to coincide with bolt holes 94 of lower housing member 34, an upper protruding portion 96 having radially spaced threaded bolt holes 97 to coincide with bolt holes 98 of upper housing member 26, a plurality of radially spaced threaded portals 40 for passage of compressed air to the individual cylinders 86. A gate valve mounting means 46 is secured to the inner wall of the center housing member 36 adjacent to each portal 40. As shown in FIG. 6, each gate valve 44 has a seal 45 for sealing portal 40 and a return spring 49 and is attached to the mounting means 46 by means of a pivot pin 48.

A plurality of high pressure hoses 50 is provided for finally communicating the compressed air to the individual cylinders 86 of the engine 12. Each high pressure hose 50 is provided at one end 52 with a threaded fitting 54 for engaging a threaded portal 40 defined by the center housing member 36, and at the other end 56 with a threaded fitting 58 for engaging the threaded spark plug orifice 18 defined by the engine 12. Thus the threaded fitting 58 is substantially similar to the threaded portion defined by a conventional spark plug. High pressure hoses 50 are connected to the individual cylinders 86 in the same order as conventional spark plug wires such that a proper sequence of compressing the pistons 88 downward in their respective cylinders 86 is accomplished.

As shown in FIG. 1, the pneumatic distributor 24 may be located at the existing distributor mount 14 of the engine 12. The rotor mount 30 is received by the through opening 28 of the lower housing member 34 and engaged by the existing timing mechanism 16. The center housing member 36 is secured to the lower housing member 34 by means of bolts 95 received by bolt holes 94 of the lower housing member 34 and the threaded bolt holes 93 of the center housing member 36. The upper housing member 26 is secured to the center housing member 36 by means of bolts 95 received by bolt holes 98 of the upper housing member 26 and the threaded bolt holes 97 of the center housing member 36.

FIG. 2 shows the pneumatic distributor 24 for a four cylinder application. As the existing timing mechanism 16 of the engine 12 is operating, the rotor 42 is continuously rotating and opening a pair of gate valves 44 to supply compressed air via portals 40 and high pressure hoses 50 to a pair of cylinders 86, (in FIG. 4, cylinders 86A and 86D), and thereby creating a power stroke to the pair of pistons 88 (in FIG. 4, pistons 88A and 88D) which are beginning the downstroke. As the rotor 42 continues to rotate, the rotor 42 releases one pair of gate valves 44 and engages the remaining pair. The return spring 49 closes the released gate valves 44 and the seal 45 ensures no compressed air can enter the associated portals 40.

If constructed as shown in FIG. 5, the pneumatic distributor 24 can be used on any four cylinder engine (or with six portals 40, on any six cylinder engine, etc.). FIG. 2 shows rotor 42 must rotate clockwise to open gate valves 44, but if the timing mechanism 16 requires counter-clockwise rotation, this can be accomplished by attaching center housing member 36 up-side-down. Only the rotor mount 30 for engaging the timing mechanism 16 may be different for another model engine. The upper housing member 26 and the lower housing member 34 can be used for any number of cylinders and the center housing member can be made with any appropriate number of portals 40.

Figure 3:
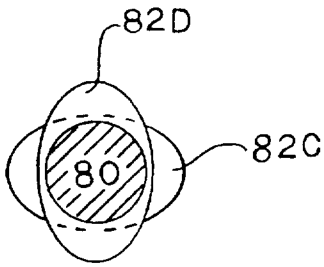
FIG. 3 is a fragmentary sectional view of the modified dual-lobed camshaft of the apparatus of this invention.
Figure 4:
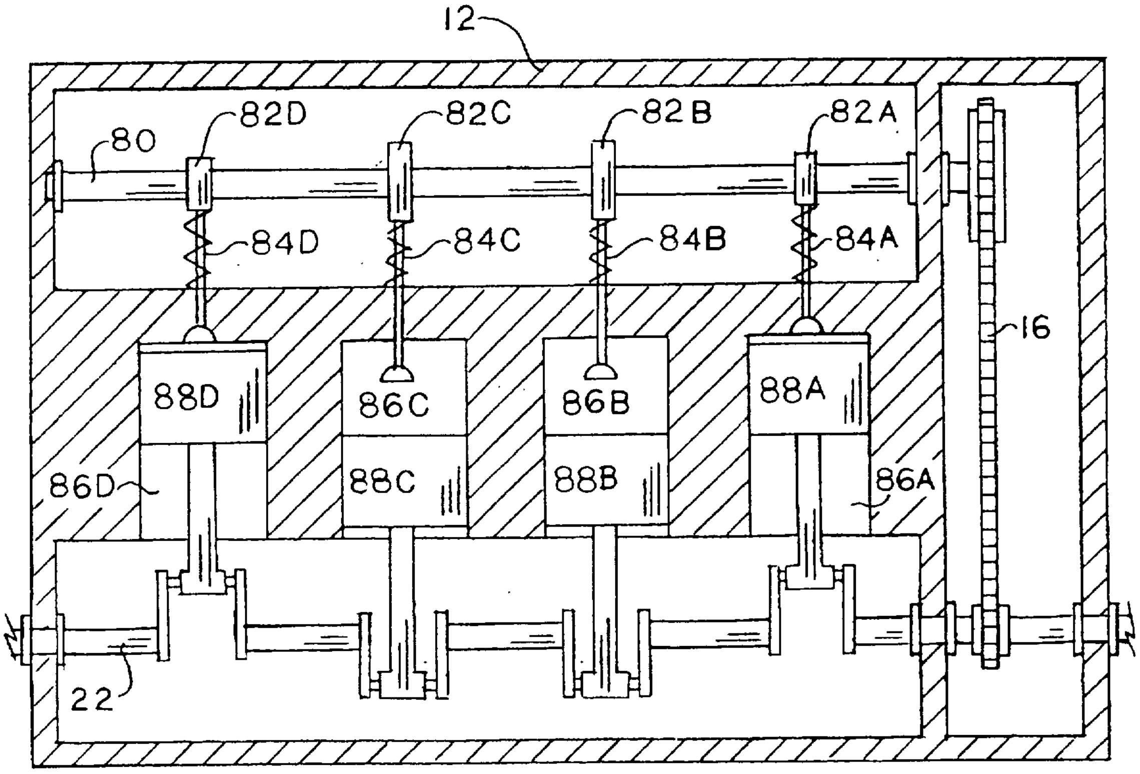
FIG. 4 is a longitudinal vertical cross-sectional view taken through a typical four cylinder engine converted to a two-stroke pneumatically powered engine using the apparatus of this invention.

The modified dual-lobed camshaft 80 replaces the original camshaft of the engine 12. The modified dual-lobed camshaft 80 operates only the exhaust valves 84 of the engine 12 and has a dual-lobed cam 82, as shown in FIG. 3, for each exhaust valve 84. As shown in FIG. 4, dual-lobed cams 82B and 82C are arranged to engage a pair of exhaust valves 84B and 84C of a pair of cylinders 86B and 86C on every upstroke of the associated pair of pistons 88B and 88C. Exhausted air freely escapes through existing exhaust ports (not shown) and exhaust manifold 90. As the modified dual-lobed camshaft 80 turns, the cams 82B and 82C disengage exhaust valves 84B and 84C, which close, and cams 82A and 82D engage and open exhaust valves 84A and 84D.

The pneumatic distributor 24 in combination with the modified dual-lobed camshaft 80 effectively converts a four-stroke engine operation to a two-stroke engine operation, that is, retaining the power stroke and the exhaust stroke while eliminating the intake stroke and the compression stroke. The result is that the engine functions at the maximum efficiency and performance possible.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,

I claim:

1. An apparatus to convert a four-stroke internal combustion engine into a two-stroke pneumatically powered engine, said combustion engine including at least one original camshaft, a timing mechanism, and a plurality of cylinders, each of said cylinders receiving a piston for reciprocating movement therein, each of said cylinders being provided with a spark plug orifice conventionally receiving a spark plug, each of said cylinders having at least one exhaust valve, said apparatus comprising:

at least one compressed air holding tank;

at least one air compressor for compressing air and delivering said compressed air to said at least one tank;

a compressed air supply line being in fluid communication between each of said at least one air compressor and each of said at least one tank;

a pneumatic distributor for receiving said compressed air from said at least one tank and distributing said compressed air to at least one of said cylinders in an order predetermined by said timing mechanism of said pneumatic engine, said pneumatic distributor including an upper housing member, a center housing member, a lower housing member, a rotor, and a plurality of gate valves, said lower housing member having a through opening to receive said rotor, said rotor being mounted to said timing mechanism, said upper housing member having an inlet portal for introducing said compressed air to said pneumatic distributor, said center housing member having a plurality of radially spaced portals, each of said portals of said center housing member having one of said plurality of gate valves, each one of said plurality of gate valves having a mounting means, a pivot pin, a return spring, and a seal, said rotor being operated by said timing mechanism and thereby opening at least one of said plurality of gate valves to supply said compressed air to each of said cylinders wherein said pistons are at top dead center thereby creating the power stroke of said pistons;

a compressed air supply line being in fluid communication between said at least one tank and said inlet portal of said upper housing member of said pneumatic distributor;

a plurality of compressed air supply lines, one each being in fluid communication between one of said plurality of portals defined by said center housing member of said pneumatic distributor and one of said spark plug orifices; and a modified dual-lobed camshaft to be used in said pneumatic engine in place of said original camshaft of said combustion engine for operating said exhaust valves during every upstroke of said pistons,

2. The apparatus of claim 1 further comprising a regulator in fluid communication between said at least one tank and said pneumatic distributor for varying the pressure and volume of said compressed air in order to control the operating speed of said pneumatic engine.

* * * * *